(12) United States Patent
Huang

(10) Patent No.: US 8,270,065 B2
(45) Date of Patent: Sep. 18, 2012

(54) COLORED ELECTROPHORETIC DISPLAY

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 286 days.

(21) Appl. No.: 12/833,243

(22) Filed: Jul. 9, 2010

(65) Prior Publication Data

US 2011/0007382 A1    Jan. 13, 2011

Related U.S. Application Data

(60) Provisional application No. 61/224,369, filed on Jul. 9, 2009.

(51) Int. Cl.
*G02B 26/00* (2006.01)
(52) U.S. Cl. .................................. 359/296; 345/107
(58) Field of Classification Search ............ 359/296; 345/107
See application file for complete search history.

(56) References Cited

U.S. PATENT DOCUMENTS

| 6,655,788 B1 | 12/2003 | Freeman | |
| 6,909,532 B2 | 6/2005 | Chung et al. | |
| 7,548,366 B2 | 6/2009 | Takei | |
| 2003/0030884 A1* | 2/2003 | Minami | 359/296 |
| 2004/0135764 A1* | 7/2004 | Takeda | 345/107 |
| 2005/0195470 A1* | 9/2005 | Takeda | 359/296 |
| 2008/0174851 A1* | 7/2008 | Kawai et al. | 359/296 |

* cited by examiner

*Primary Examiner* — Evelyn A. Lester
(74) *Attorney, Agent, or Firm* — J.C. Patents

(57) ABSTRACT

A colored electrophoretic display includes a transparent substrate, a transparent conductive layer, a planar electrophoretic cell, and a backplane substrate in sequence of receiving an incident light. The backplane substrate includes a first block reflective electrode, a second block reflective electrode and a third block reflective electrode, tiled in a planar arrangement perpendicular to the incident light and electrically connected to a driving circuitry in the backplane substrate. The driving circuitry electrically drives the first block reflective electrode, the second block reflective electrode and the third block reflective electrode individually as well as the transparent conductive layer to form spatially colored reflective light modulation.

16 Claims, 4 Drawing Sheets

COLORED ELECTROPHORETIC DISPLAY

CROSS-REFERENCE TO RELATED APPLICATIONS

This application claims priority of U.S. provisional application No. 61/224,369, filed on Jul. 9, 2009, entitled "COLORED ELECTROPHORETIC DISPLAY", which is incorporated herein by reference in its entirety.

FIELD OF THE TECHNOLOGY

The present invention generally relates to the technical field of spatial modulation display, and more particularly to a colored electrophoretic display.

BACKGROUND

In recent years, a colored electrophoretic display (EPD) in particular, enabled by the optoelectronic technology and the integrated circuits technology, have become a mainstream of display devices. An EPD display has several advantageous features including thin-flat shape, lightweight, low operating voltage, low power-consumption, full colorization and low radiation, among others.

An EPD panel offers even more cost effective plat or flexible panel information display, as it employs a planar electrophoretic cell placed between a conductive transparent film and an array of electrode pixels on a low cost and ever flexible substrate like thermal plastic. Colorization is always one of the critical technical components to EPD. The most commonly used colorization scheme is to use the pixilated-electrode matrix backplane to move conductive particles in the planar electrophoretic cell so as to allow white light from a back light source to pass through the planar electrophoretic cell. Then RGB color filters in the color filter array film made of polymeric materials containing color pigments and/or dye change the white light passing through the planar electrophoretic cell into colored lights so as to realize colorization. During colorization, the color filters in the existing color filter array film are required to accurately align with pixilated-electrodes in the pixilated-electrode matrix backplane, which increases complexity of EPD.

SUMMARY

The present invention provides a colored EPD to decrease complexity of EPD.

An embodiment of the present invention provides a colored electrophoretic display. In an order of vertically receiving an incident light, the colored electrophoretic display includes a transparent substrate, a transparent conductive layer, a planar electrophoretic cell and a backplane substrate. The backplane substrate includes: a first block reflective electrode, a second block reflective electrode and a third block reflective electrode, tiled in a planar arrangement perpendicular to the incident direction, adapted for block reflecting the incident light passing through the transparent substrate and forming a first band block light in a first block band, a second band block light in a second block band, and third band block light in a third block band respectively; and a driving circuitry electrically connected to the transparent conductive layer, the first block reflective electrode, the second block reflective electrode and the third block reflective electrode, adapted for electrically charging the transparent conductive layer and each of the first block reflective electrode, the second block reflective electrode and the third block reflective electrode individually and driving conductive particles in the planar electrophoretic cell to move accordingly so as to allow the first band block light, the second band block light and the third band block light to irradiate out of the transparent substrate.

In the present invention, the colored electrophoretic display uses three block reflective electrodes to perform spatially modulation of reflective lights so as to realize colorization; therefore, there is no need to use the existing color filter array film and the requirement that the color filters shall accurately align with pixilated-electrodes in the pixilated-electrode matrix backplane does not exist accordingly, which decreases complexity of EPD.

BRIEF DESCRIPTION OF THE DRAWINGS

The disclosure may be more completely understood in consideration of the following detailed description of various embodiments in connection with the accompanying drawings, in which.

DETAILED DESCRIPTION

The drawings for illustration are not necessarily to scale, emphasis instead being placed upon illustrating the framework and principles of the present invention. In the following description, reference is made to the accompanying drawings which form a part hereof, and which show, by way of illustration, a preferred embodiment of the present invention. It is understood that other embodiments may be utilized and structural changes may be made without departing from the scope of the present invention.

Figure 1:
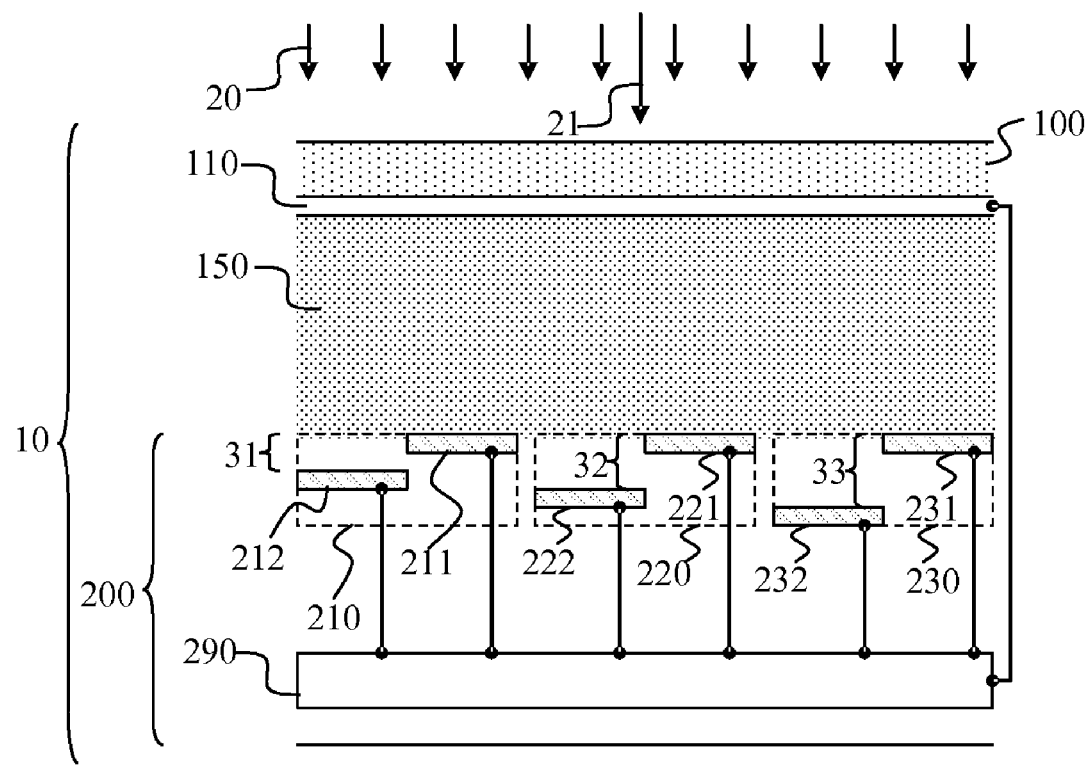
FIG. 1 is a cross sectional view of the colored electrophoretic display according to an embodiment of the present invention.

FIG. 1 is a cross sectional view of the colored electrophoretic display 10 according to an embodiment of the present invention. In the order of vertically receiving an incident light 20 along an incident direction 21, the colored electrophoretic display 10 includes the following planar constituents, all perpendicular to the incident direction 21: a transparent substrate 100, a transparent conductive layer 110, a planar electrophoretic cell 150 and a backplane substrate 200. The backplane substrate 200 includes a first block reflective electrode 210, a second block reflective electrode 220 and a third block reflective electrode 230, tiled in a planar arrangement perpendicular to the incident direction 21, and a driving circuitry 290 electrically connected to the transparent conductive layer 110, the first block reflective electrode 210, the second block reflective electrode 220 and the third block reflective electrode 230.

During image display, the first block reflective electrode 210, the second block reflective electrode 220 and the third block reflective electrode 230 reflect the incident light 20 passing through the transparent substrate 100 and form a first band block light in a first block band 51, a second band block light in a second block band 52, and third band block light in a third block band 53 respectively. Meanwhile, the driving circuitry 290 electrically charges the transparent conductive layer 110 and each of the first block reflective electrode 210, the second block reflective electrode 220 and the third block reflective electrode 230 individually so as to form corresponding electric field to drive conductive particles in the planar electrophoretic cell 150 to move accordingly so as to allow the first band block light, the second band block light and the third band block light to irradiate out of the transparent substrate 100. The conductive particles may be titanium oxide fine particles suspended in carbohydrate liquid in the planar electrophoretic cell 150. The transparent conductive layer 110 made of conductive transparent polymer or indium-tin-oxide (ITO) or other optically transparent but electrically conductive films may control the magnitudes or durations of the charging performed by the driving circuitry 290.

Specifically, the first block band 51, the second block band 52 and the third block band 53 correspond to absorption spectra of cyan, yellow and magenta, respectively so as to display colorful images based on a cyan, yellow and magenta (CYM) color model which is normally adopted in the 3-color printing industry. The CYM color model is spectrum complementary to the red, green and blue (RGB) color model which is normally used in existing display.

In the present embodiment, the colored electrophoretic display uses three block reflective electrodes to perform spatially modulation of reflective lights so as to realize colorization; therefore, there is no need to use the existing color filter array film and the requirement that the color filters shall accurately align with pixilated-electrodes in the pixilated-electrode matrix backplane does not exist accordingly, which decreases complexity of EPD.

Alternatively, as shown in FIG. 1, the first block reflective electrode 210 includes a first high reflecting element 211 and a first low reflecting element 212, electrically connected to the driving circuitry 290, tiled in a planar configuration perpendicular to the incident direction 21 and vertically spaced in a first spacing 31 equal to $m*[\lambda_1/4]$, wherein $\lambda_1$ is a first interference wavelength 41 centering the first block band 51 and m is an odd integer. Thus, the first block reflective electrode 210 through the first high reflecting element 211 and the first low reflecting element 212, produces destructive interference of the reflected portions to the incident light 20 of bandwidth defined by the first block band 51 so as to produce the first band block light.

Figure 5A:
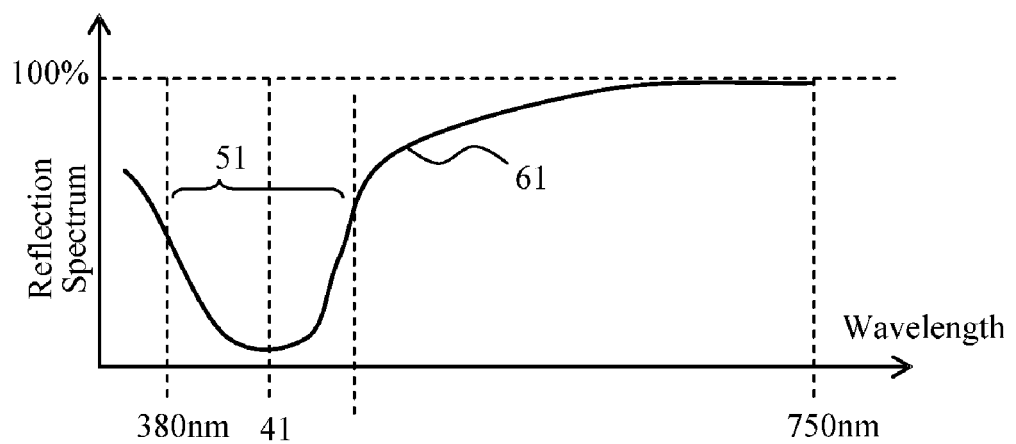
FIG. 5*a* illustrates the spectrum of the first band block light produced by the first block reflective electrode of the colored electrophoretic display according to an embodiment of the present invention.

FIG. 5a illustrates reflection spectrum 61 of the first band block light produced by the first block reflective electrode 210. As shown in this figure, the reflection spectrum 61 covers over visible spectrum (typically defined from 380 to 750 nm). Main power of the reflection spectrum 61 is concentrated within the first block band 51 centered by the first interference wavelength 41 close to 420 nm, which is the absorbance spectrum of yellow.

Meanwhile, the second block reflective electrode 220 comprises a second high reflecting element 221 and a second low reflecting element 222, electrically connected to the driving circuitry 290, tiled in a planar configuration perpendicular to the incident direction 21 and vertically spaced in a second spacing 32 equal to $n*[\lambda_2/4]$, wherein $\lambda_2$ is a second interference wavelength 42 centering the second block band 52 and n is an odd integer. Thus, the second block reflective electrode 220 through the second high reflecting element 221 and the second low reflecting element 222, produces destructive interference of the reflected portions to the incident light 20 of bandwidth defined by the second block band 52 so as to produce the second band block light.

Figure 5B:
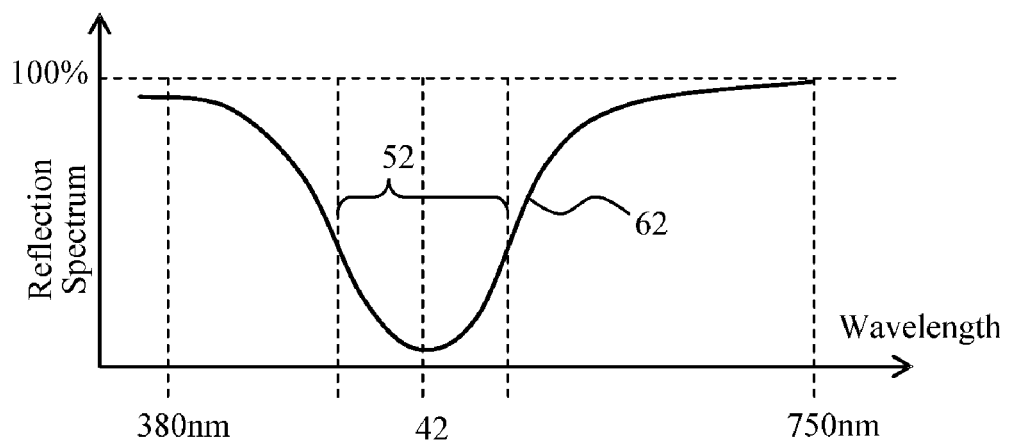
FIG. 5*b* illustrates the spectrum of the second band block light produced by the second block reflective electrode of the colored electrophoretic display according to an embodiment of the present invention.

FIG. 5b illustrates reflection spectrum 62 of the second band block light produced by the second block reflective electrode 220. As shown in this figure, the reflection spectrum 62 covers over visible spectrum (typically defined from 380 to 750 nm). Main power of the reflection spectrum 62 is concentrated within the second block band 52 centered by the second interference wavelength 42 close to 530 nm, which is the absorbance spectrum of magenta.

Similarly, the third block reflective electrode 230 comprises a third high reflecting element 231 and a third low reflecting element 232, electrically connected to the driving circuitry 290, tiled in a planar configuration perpendicular to the incident direction 21 and vertically spaced in a third spacing 33 equal to $p*[\lambda_3/4]$, wherein $\lambda_3$ is a third interference wavelength 43 centering the third block band 53 and p is an odd integer. Thus, the third block reflective electrode 230 through the third high reflecting element 231 and the third low reflecting element 232, produces destructive interference of the reflected portions to the incident light 20 of bandwidth defined by the third block band 53 so as to produce the third band block light.

Figure 5C:
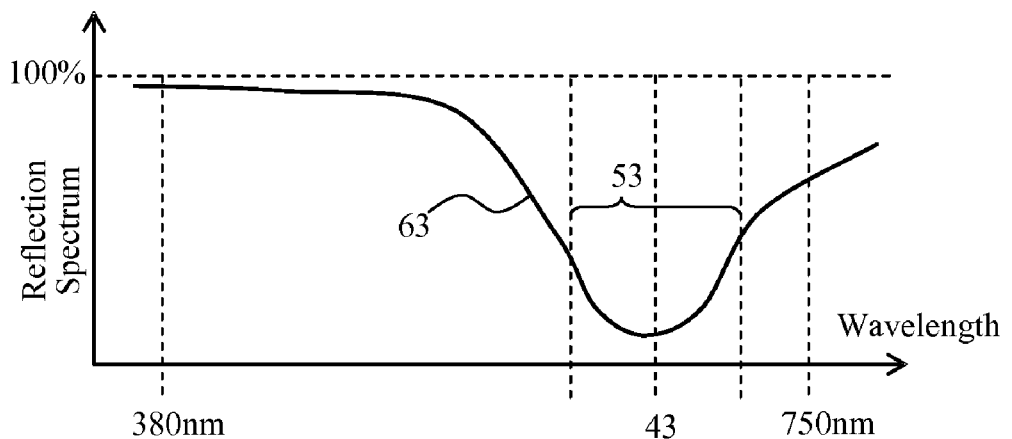
FIG. 5*c* illustrates the spectrum of the third band block light produced by the third block reflective electrode of the colored electrophoretic display according to an embodiment of the present invention.

FIG. 5c illustrates reflection spectrum 63 of the third band block light produced by the second block reflective electrode 230. As shown in this figure, the reflection spectrum 63 covers over visible spectrum (typically defined from 380 to 750 nm). Main power of the reflection spectrum 63 is concentrated within the third block band 53 centered by the third interference wavelength 43 close to 640 nm, which is the absorbance spectrum of cyan.

Specifically, as shown in FIG. 1, the first high reflecting element 211 and the first low reflecting element 212 are both directly electrically connected to the driving circuitry 290; the second high reflecting element 221 and the second low reflecting element 222 are both directly electrically connected to the driving circuitry 290; and the third high reflecting element 231 and the third low reflecting element 232 are both directly electrically connected to the driving circuitry 290.

Figure 2:
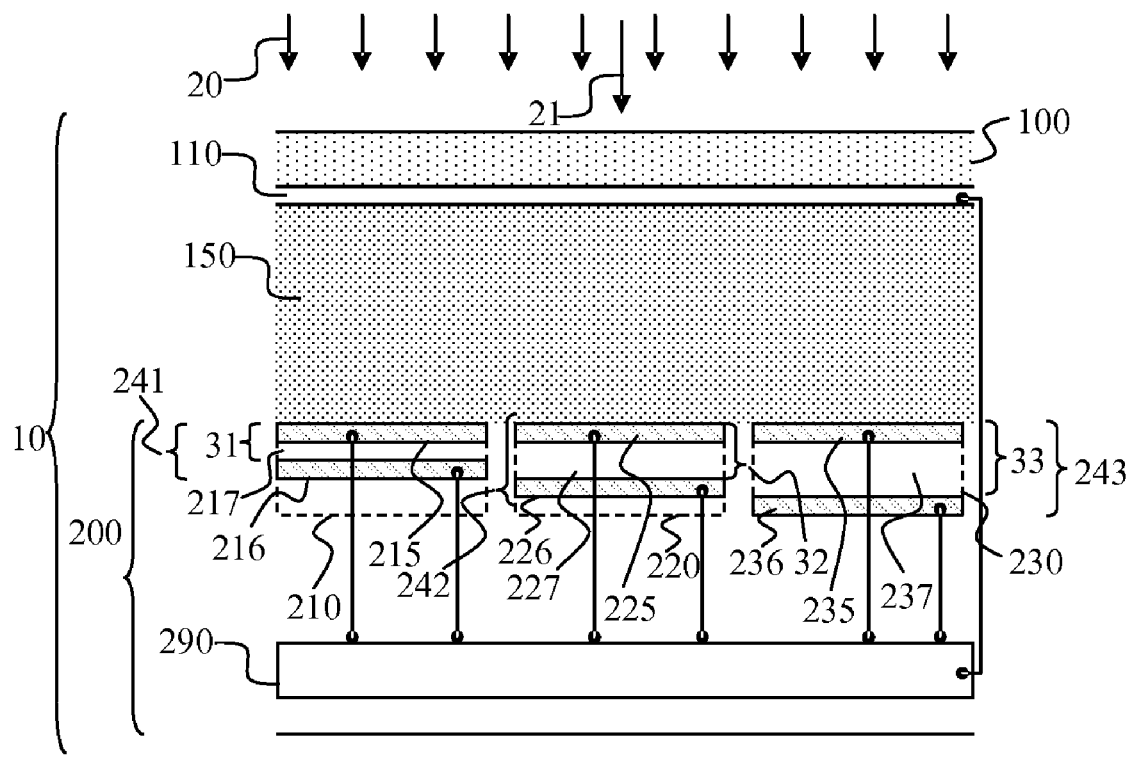
FIG. 2 is a cross sectional view of the colored electrophoretic display 10 according to another embodiment of the present invention.

When the driving circuitry 290 electrically charges the first high reflecting element 211 with the first low reflecting element 212, the second high reflecting element 221 with the second low reflecting element 222, and the third high reflecting element 231 with the third low reflecting element 232 individually, the conductive particles of the planar electrophoretic cell 150 will be moved so as to allow the first band block light, the second band block light and the third band block light to passing through transparent conductive layer 110 and irradiate out of the transparent substrate 100 so as to form colorful image. The driving circuitry 290 may be built with thin film transistors (TFT) with external column and row driver circuitries attached to the backplane substrate 200 of formed on the colored electrophoretic display 10, or completely configured into the backplane substrate 200. Specifically, the backplane substrate 200 may be made of any one or layered combination of thermal plastic, glass and silicon FIG. 2 is a cross sectional view of the colored electrophoretic display 10 according to another embodiment of the present invention. In this embodiment, the basic planar constituents and configuration of the colored electrophoretic display 10 are the same, except that the structures of block reflective electrodes as follows:

In the present embodiment, the first block reflective electrode 210 includes a first top conductive reflecting plate 215 and a first bottom conductive reflecting plate 216, electrically connected to the driving circuitry 290, configured in a vertically aligned and stacked arrangement both perpendicular to the incident direction 21 and vertically spaced in a first spacing 31 equal to $m*[\lambda_1/4]$, wherein $\lambda_1$ is a first interference wavelength 41 centering the first block band 51 and m is an odd integer.

The first top conductive reflecting plate 215 reflects part (substantially close to 50%) of the total incident light 20 and transmits the other part of the total incident light 20 to the first bottom conductive reflecting plate 216, and then the first bottom conductive reflecting plate 216 reflects the transmitted light. As they are vertically spaced in a first spacing 31, destructive interference is produced to form the first band block light of the first block band 51 as shown in FIG. 5a.

The second block reflective electrode 220 includes a second top conductive reflecting plate 225 and a second bottom conductive reflecting plate 226, electrically connected to the driving circuitry 290, configured in a vertically aligned and stacked arrangement both perpendicular to the incident direction 21 and vertically spaced in a second spacing 32 equal to $n*[\lambda_2/4]$, wherein $\lambda_2$ is a second interference wavelength 42 centering the second block band 52 and n is an odd integer.

The second top conductive reflecting plate 225 reflects part (substantially close to 50%) of the total incident light 20 and transmits the other part of the total incident light 20 to the second bottom conductive reflecting plate 226, and then the second bottom conductive reflecting plate 226 reflects the transmitted light. As they are vertically spaced in a second spacing 32, destructive interference is produced to form the first band block light of the second block band 52 as shown in FIG. 5b.

The third block reflective electrode 230 includes a third top conductive reflecting plate 235 and a third bottom conductive reflecting plate 236, electrically connected to the driving circuitry 290, configured in a vertically aligned and stacked arrangement both perpendicular to the incident direction 21 and vertically spaced in a third spacing 33 equal to $p*[\lambda_3/4]$, wherein $\lambda_3$ is a third interference wavelength 43 centering the third block band 53 and p is an odd integer.

The third top conductive reflecting plate 235 reflects part (substantially close to 50%) of the total incident light 20 and transmits the other part of the total incident light 20 to the third bottom conductive reflecting plate 236, and then the third bottom conductive reflecting plate 236 reflects the transmitted light. As they are vertically spaced in a third spacing 33, destructive interference is produced to form the third band block light of the third block band 53 as shown in FIG. 5c.

Specifically, as shown in FIG. 2, the first top conductive reflecting plate 215 and the first bottom conductive reflecting plate 216 are both directly electrically connected to the driving circuitry 290; the second top conductive reflecting plate 225 and the second bottom conductive reflecting plate 226 are both directly electrically connected to the driving circuitry 290; and the third top conductive reflecting plate 235 and the third bottom conductive reflecting plate 236 are both directly electrically connected to the driving circuitry 290.

The first top conductive reflecting plate 215 and the first bottom conductive reflecting plate 216 jointly form a first planar capacitor 241, as separated by vacuum, air or a dielectric layer. The same are applied to the second top conductive reflecting plate 225 and the second bottom conductive reflecting plate 226 as a second planar capacitor 242, and the third top conductive reflecting plate 235 and the third bottom conductive reflecting plate 236 as a third planar capacitor 243, also separated by vacuum, air or dielectric layers. The dielectric layers, as the first thin transparent spacer 217, the second thin transparent spacer 227 and third thin transparent spacer 237 shown in FIG. 2, are made from any or combination of polyimide, polycarbonate, resin, silicon oxide, silicon nitride, silicon carbide, silicon oxynitride, silicon carbon oxynitride, titanium oxide, tantalum oxide, tantalum nitride and hafnium oxide. Specifically, the first thin transparent spacer 217 is sandwiched between the first top conductive reflecting plate 215 and the first bottom conductive reflecting plate 216, the second thin transparent spacer 227 is sandwiched between the second top conductive reflecting plate 225 and the second bottom conductive reflecting plate 226, and the third thin transparent spacer 237 is sandwiched between the third top conductive reflecting plate 235 and the third bottom conductive reflecting plate 236.

Very commonly to LCD and semiconductor industry, reflective metals and alloys, including aluminum, titanium, copper, cobalt, silver, platinum and gold as well as their alloys, are suitable candidates for fabricating the first, second and third block reflective electrodes, 210, 220 and 230, and in particular, their constituents. Those constituents include the first, second and third high reflecting elements, 211, 221 and 231, and the first, second and third low reflecting elements, 212, 222 and 232, in the one embodiment and the first, second and third top conductive reflecting plates, 215, 225 and 235, and the first, second and third bottom conductive reflecting plates, 216, 226 and 236; all of them are made from any or combination of those reflective metals and their alloys.

Figure 3:
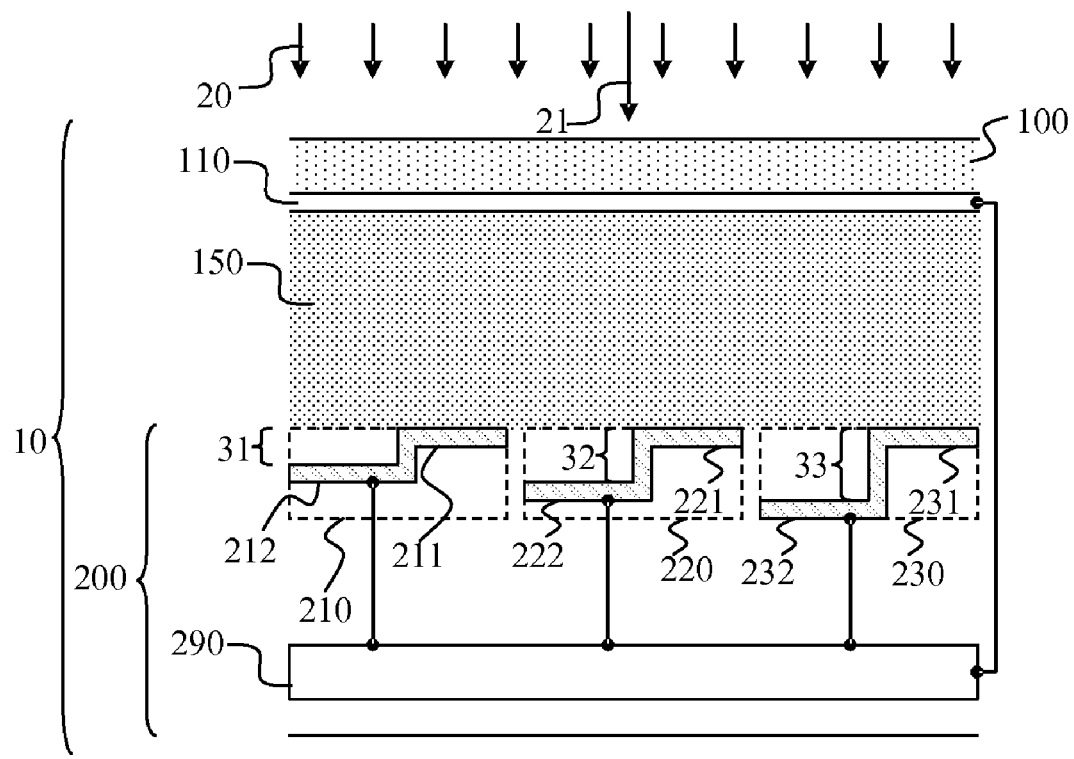
FIG. 3 is a cross sectional view of an improved structure of the colored electrophoretic display shown in FIG. 1.

FIG. 3 is a cross sectional view of an improved structure of the colored electrophoretic display shown in FIG. 1. As shown in this figure, the first high reflecting element 211 and the first low reflecting element 212 are electrically connected at their adjacent edges, the first low reflecting element 212 is directly electrically connected to the driving circuitry 290, and the first high reflecting element 211 is indirectly electrically connected to the driving circuitry 290 via the first low reflecting element 212; the second high reflecting element 221 and the second low reflecting element 222 are electrically connected at their adjacent edges, the second low reflecting element 222 is directly electrically connected to the driving circuitry 290 and the second high reflecting element 221 is indirectly electrically connected to the driving circuitry 290 via the second low reflecting element 222; and the third high reflecting element 231 and the third low reflecting element 232 are electrically connected at their adjacent edges, the third low reflecting element 232 is directly electrically connected to the driving circuitry 290 and third high reflecting element 231 is indirectly electrically connected to the driving circuitry 290 via the third low reflecting element 232. When the driving circuitry 290 is performing charging, electrical charge is first applied to the first low reflecting element 212, the second low reflecting element 222, and the third low reflecting element 232 individually, and then is transferred and applied to the first high reflecting element 211, the second high reflecting element 221 and the third high reflecting element 231.

Figure 4:
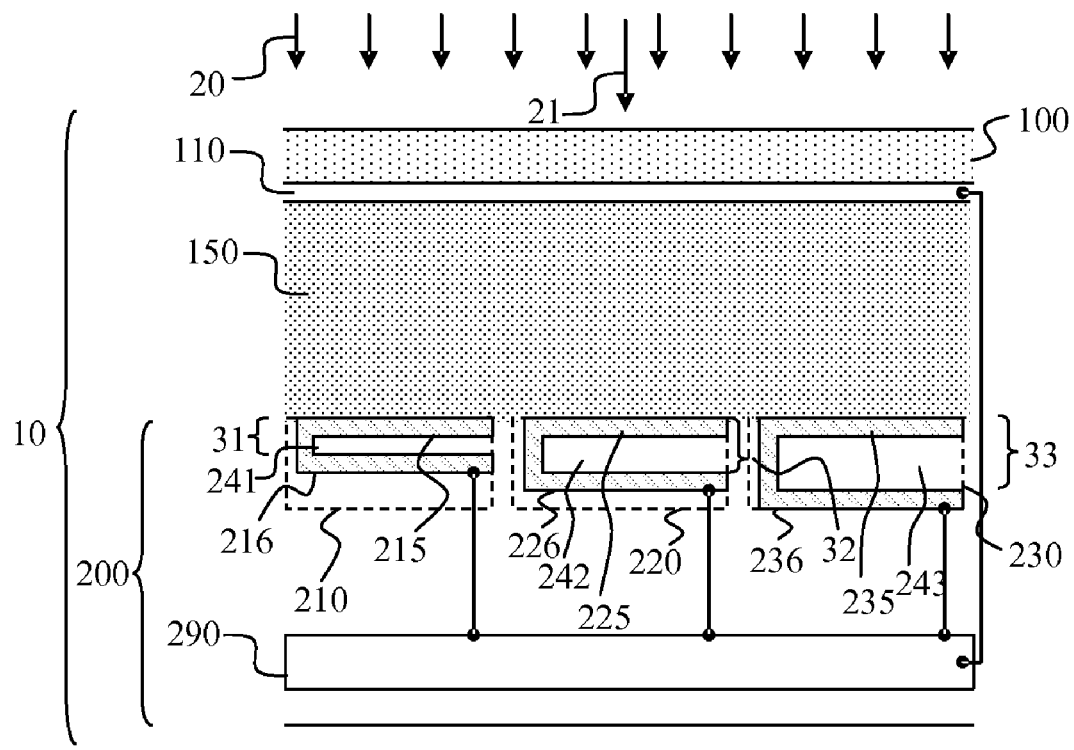
FIG. 4 is a cross sectional view of an improved structure of the colored electrophoretic display shown in FIG. 2.

FIG. 4 is a cross sectional view of an improved structure of the colored electrophoretic display shown in FIG. 2. As shown in this figure, the first top conductive reflecting plate 215 and the first bottom conductive reflecting plate 216 are electrically connected at their same-side edges, the first bottom conductive reflecting plate 216 is directly electrically connected to the driving circuitry 290, and the first top conductive reflecting plate 215 is indirectly electrically connected to the driving circuitry 290 via the first bottom conductive reflecting plate 216; the second top conductive reflecting plate 225 and the second bottom conductive reflecting plate 226 are electrically connected at their same-side edges, the second bottom conductive reflecting plate 226 is directly electrically connected to the driving circuitry 290, and the second top conductive reflecting plate 225 is indirectly electrically connected to the driving circuitry 290 via the second bottom conductive reflecting plate 226; and the third top conductive reflecting plate 235 and the third bottom conductive reflecting plate 236 are electrically connected at their same-side edges, the third bottom conductive reflecting plate 236 is directly electrically connected to the driving circuitry 290 and the third top conductive reflecting plate 235 is indirectly electrically connected to the driving circuitry 290 via the third bottom conductive reflecting plate 236. When the driving circuitry 290 is performing charging, electrical charge is first applied to the first bottom conductive reflecting plate 216, the second bottom conductive reflecting plate 226, and the third bottom conductive reflecting plate 236, individually, and then is transferred and applied to the first top conductive reflecting plate 215, the second top conductive reflecting plate 225 and the third top conductive reflecting plate 235.

Figure 6A:
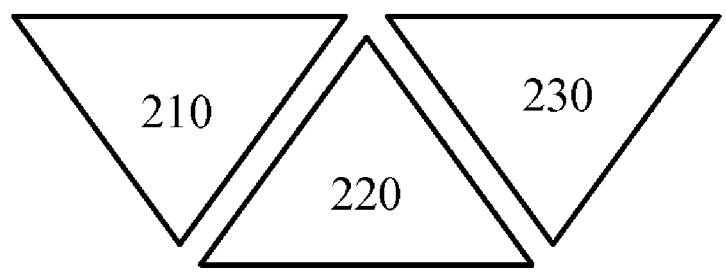
FIGS. 6*a*, 6*b* and 6*c* are top views of the block reflective electrodes in the colored electrophoretic display in the present invention.
Figure 6B:
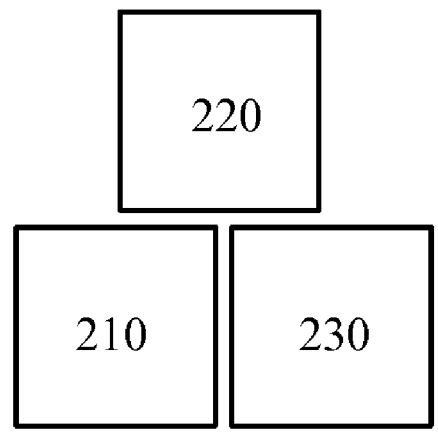
Figure 6C:
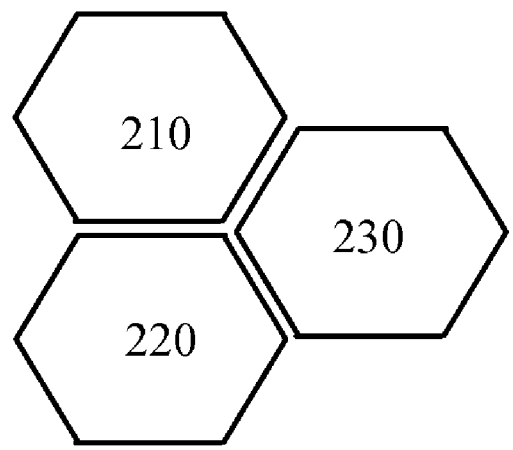

FIGS. 6a, 6b and 6c are top views of the block reflective electrodes of the colored electrophoretic display 10 in the some embodiments of the present invention, illustrating some of their valid spatial shapes and associated tiling. As employed onto the flat panel display application, the block reflective electrodes, 210, 220 and 230, are grouped first and then duplicated in a regularly tiled planar array. The individual constituent block reflective electrodes, 210, 220 and 230, may be configured in a regular and adequate shape to forming the regularly tiled planar array. Typically as disclosed and used in industrial practice in the regular flat panel display panels, the first, second and third block reflective electrodes, 210, 220 and 230, are optionally shaped in triangles as shown in FIG. 6a, squares as shown in FIG. 6b and hexagons as shown in FIG. 6c, besides others including rectangles, octagons and circles.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A colored electrophoretic display, in an order of vertically receiving an incident light in an incident direction, comprising: a transparent substrate, a transparent conductive layer, a planar electrophoretic cell and a backplane substrate; the backplane substrate comprises:
    a first block reflective electrode, a second block reflective electrode and a third block reflective electrode, tiled in a planar arrangement perpendicular to the incident direction, adapted for band block reflecting the incident light passing through the transparent substrate and forming a first band block light in a first block band, a second band block light in a second block band, and third band block light in a third block band respectively; and
    a driving circuitry electrically connected to the transparent conductive layer, the first block reflective electrode, the second block reflective electrode and the third block reflective electrode, adapted for electrically charging the transparent conductive layer and each of the first block reflective electrode, the second block reflective electrode and the third block reflective electrode individually and driving conductive particles in the planar electrophoretic cell to move accordingly so as to allow the first band block light, the second band block light and the third band block light to irradiate out of the transparent substrate.

2. The colored electrophoretic display according to claim 1, wherein:
    the first block reflective electrode comprises a first high reflecting element and a first low reflecting element, electrically connected to the driving circuitry, tiled in a planar configuration perpendicular to the incident direction and vertically spaced in a first spacing equal to $m*[\lambda_1/4]$, wherein $\lambda_1$ is a first interference wavelength centering the first block band and m is an odd integer;
    the second block reflective electrode comprises a second high reflecting element and a second low reflecting element, electrically connected to the driving circuitry, tiled in a planar configuration perpendicular to the incident direction and vertically spaced in a second spacing equal to $n*[\lambda_2/4]$, wherein $\lambda_2$ is a second interference wavelength centering the second block band and n is an odd integer; and
    the third block reflective electrode comprises a third high reflecting element and a third low reflecting element, electrically connected to the driving circuitry, tiled in a planar configuration perpendicular to the incident direction and vertically spaced in a third spacing equal to $p*[\lambda_3/4]$, wherein $\lambda_3$ is a third interference wavelength centering the third block band and p is an odd integer.

3. The colored electrophoretic display according to claim 2, wherein:
    the first high reflecting element and the first low reflecting element are both directly electrically connected to the driving circuitry;
    the second high reflecting element and the second low reflecting element are both directly electrically connected to the driving circuitry;
    the third high reflecting element and the third low reflecting element are both directly electrically connected to the driving circuitry.

4. The colored electrophoretic display according to claim 2, wherein:
    the first high reflecting element and the first low reflecting element are electrically connected at their adjacent edges, the first low reflecting element is directly electrically connected to the driving circuitry, and the first high reflecting element is indirectly electrically connected to the driving circuitry via the first low reflecting element;
    the second high reflecting element and the second low reflecting element are electrically connected at their adjacent edges, the second low reflecting element is directly electrically connected to the driving circuitry and the second high reflecting element is indirectly electrically connected to the driving circuitry via the second low reflecting element;
    the third high reflecting element and the third low reflecting element are electrically connected at their adjacent edges, the third low reflecting element is directly electrically connected to the driving circuitry and third high reflecting element is indirectly electrically connected to the driving circuitry via the third low reflecting element.

5. The colored electrophoretic display according to claim 2, wherein the first high reflecting element and the first low reflecting element, the second high reflecting element and the second low reflecting element and the third high reflecting element and the third low reflecting element are made of any or combination of reflective metals including aluminum, titanium, copper, cobalt, silver, platinum and gold.

6. The colored electrophoretic display according to claim 1, wherein:
the first block reflective electrode comprises a first top conductive reflecting plate and a first bottom conductive reflecting plate, electrically connected to the driving circuitry, configured in a vertically aligned and stacked arrangement both perpendicular to the incident direction and vertically spaced in a first spacing equal to $m*[\lambda_1/4]$, wherein $\lambda_1$ is a first interference wavelength centering the first block band and m is an odd integer;
the second block reflective electrode comprises a second top conductive reflecting plate and a second bottom conductive reflecting plate, electrically connected to the driving circuitry, configured in a vertically aligned and stacked arrangement both perpendicular to the incident direction and vertically spaced in a second spacing equal to $n*[\lambda_2/4]$, wherein $\lambda_2$ is a second interference wavelength centering the second block band and n is an odd integer; and
the third block reflective electrode comprises a third top conductive reflecting plate and a third bottom conductive reflecting plate, electrically connected to the driving circuitry, configured in a vertically aligned and stacked arrangement both perpendicular to the incident direction and vertically spaced in a third spacing equal to $p*[\lambda_2/4]$, wherein $\lambda_3$ is a third interference wavelength centering the third block band and p is an odd integer.

7. The colored electrophoretic display according to claim 6, wherein:
the first top conductive reflecting plate and the first bottom conductive reflecting plate are both directly electrically connected to the driving circuitry;
the second top conductive reflecting plate and the second bottom conductive reflecting plate are both directly electrically connected to the driving circuitry;
the third top conductive reflecting plate and the third bottom conductive reflecting plate are both directly electrically connected to the driving circuitry.

8. The colored electrophoretic display according to claim 6, wherein:
the first top conductive reflecting plate and the first bottom conductive reflecting plate are electrically connected at their same-side edges, the first bottom conductive reflecting plate is directly electrically connected to the driving circuitry, and the first top conductive reflecting plate is indirectly electrically connected to the driving circuitry via the first bottom conductive reflecting plate;
the second top conductive reflecting plate and the second bottom conductive reflecting plate are electrically connected at their same-side edges, the second bottom conductive reflecting plate is directly electrically connected to the driving circuitry, and the second top conductive reflecting plate is indirectly electrically connected to the driving circuitry via the second bottom conductive reflecting plate;
the third top conductive reflecting plate and the third bottom conductive reflecting plate are electrically connected at their same-side edges, the third bottom conductive reflecting plate is directly electrically connected to the driving circuitry and the third top conductive reflecting plate is indirectly electrically connected to the driving circuitry via the third bottom conductive reflecting plate.

9. The colored electrophoretic display according to claim 6, wherein the first top conductive reflecting plate and the first bottom conductive reflecting plate, the second top conductive reflecting plate and the second bottom conductive reflecting plate, the third top conductive reflecting plate and the third bottom conductive reflecting plate are made of any or combination of reflective metals including aluminum, titanium, copper, cobalt, silver, platinum and gold.

10. The colored electrophoretic display according to claim 6, wherein a first thin transparent spacer is sandwiched between the first top conductive reflecting plate and the first bottom conductive reflecting plate to form a first planar capacitor, a second thin transparent spacer is sandwiched between the second top conductive reflecting plate and the second bottom conductive reflecting plate to form a second planar capacitor, and a third thin transparent spacer is sandwiched between the third top conductive reflecting plate and the third bottom conductive reflecting plate to form a third planar capacitor.

11. The colored electrophoretic display according to claim 10, wherein the first thin transparent spacer, the second thin transparent spacer and third thin transparent spacer are made from any of combination of polyimide, polycarbonate, resin, silicon oxide, silicon nitride, silicon carbide, silicon oxynitride, silicon carbon oxynitride, titanium oxide, tantalum oxide, tantalum nitride and hafnium oxide.

12. The colored electrophoretic display according to claim 1, wherein the backplane substrate is made of any one or layered combination of thermal plastic, glass and silicon.

13. The colored electrophoretic display according to claim 1, wherein the conductive particles are titanium oxide fine particles suspended in carbohydrate liquid in the planar electrophoretic cell.

14. The colored electrophoretic display according to claim 1, wherein the first block band, the second block band and the third block band correspond to absorption spectra of cyan, yellow and magenta respectively.

15. The colored electrophoretic display according to claim 1, wherein the transparent conductive layer is made of conductive transparent polymer or indium tin oxide (ITO).

16. The colored electrophoretic display according to claim 1, wherein a cross sectional shape perpendicular to the incident direction of each of the first block reflective electrode, the second block reflective electrode and the third block reflective electrode is configured with a selective planar shape from triangle, square, rectangle, hexagon, octagon and circle.

* * * * *